United States Patent [19]

Rodriguez et al.

[11] Patent Number: 4,774,430

[45] Date of Patent: Sep. 27, 1988

[54] BRUSH ASSEMBLY FOR ELECTRICAL MOTORS

[75] Inventors: Emilio Rodriguez; Antonio Martinez, both of Barcelona, Spain

[73] Assignee: Braun Aktiengesellschaft, Kronberg, Fed. Rep. of Germany

[21] Appl. No.: 938,012

[22] Filed: Dec. 4, 1986

[30] Foreign Application Priority Data

Dec. 17, 1985 [ES] Spain .................................... 291.075

[51] Int. Cl.[4] .............................................. H02K 13/00

[52] U.S. Cl. ...................................... 310/239; 310/71; 310/68 A; 310/89; 310/241

[58] Field of Search ..................... 310/89, 42, 71, 239, 310/240, 241, 242, 244, 245, 246, 247, 248, 68 A, 238, 43, 45, 233; 200/1 V

[56] References Cited

U.S. PATENT DOCUMENTS

| | | | |
|---|---|---|---|
| 4,195,242 | 3/1980 | Mabuchi | 310/242 |
| 4,228,376 | 10/1980 | Mabuchi | 310/242 |
| 4,254,353 | 3/1981 | Matsuda | 310/42 |
| 4,523,116 | 6/1985 | Dibbern, Jr. | 310/71 |
| 4,638,203 | 1/1983 | Maki | 310/239 |

FOREIGN PATENT DOCUMENTS

| | | | |
|---|---|---|---|
| 2458991 | 3/1980 | Fed. Rep. of Germany . | |
| 0781107 | 8/1954 | United Kingdom | 310/239 |
| 1108080 | 4/1968 | United Kingdom | 310/239 |

*Primary Examiner*—R. Skudy

[57] ABSTRACT

The brush assembly for electrical motors comprises a housing cap (10) which consists of an insulating material and which closes the motor on its frontal end, the said cap's inner side (16) being provided with projections (7, 8) extending in parallel to the motor axis. These projections (7, 8) are penetrated by openings (12, 13) for the accommodation and fixation of elastic commutator brushes (1, 2). The contact lugs (32, 33) which can be inserted from the outside into the slot-shaped openings (12, 13) are coupled stationarily to the commutator brushes (1, 2) by virtue of a close-fit arrangement (36, 37) designed at the latter.

10 Claims, 1 Drawing Sheet

BRUSH ASSEMBLY FOR ELECTRICAL MOTORS

Figure 1:
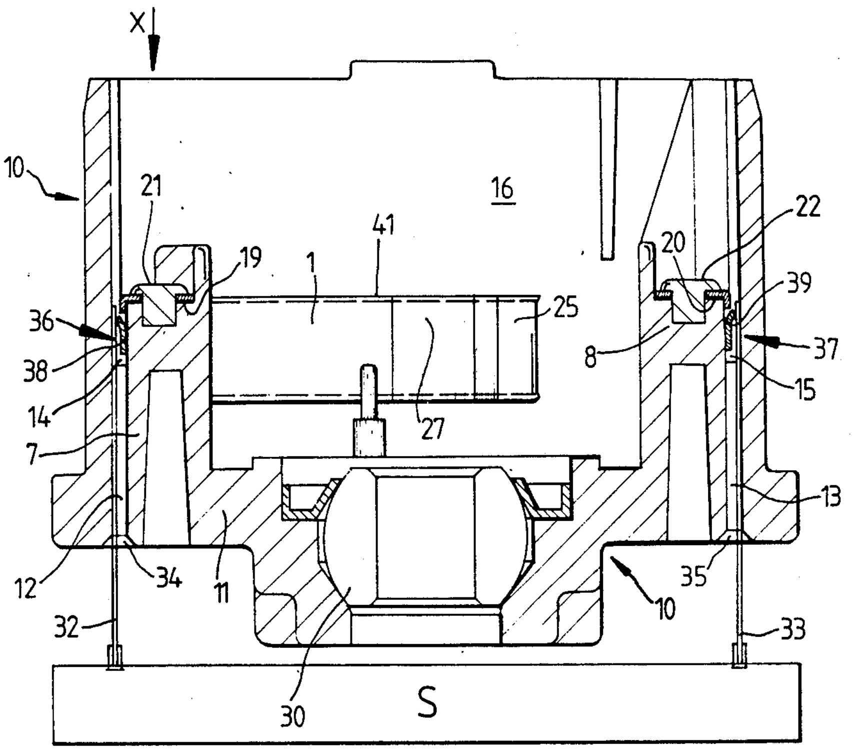

The present invention relates to a brush assembly for electrical motors comprising a housing cap made of an insulating material and closing the motor on its frontal end, with the cap's inner side being furnished with projections which extend in parallel to the motor axis, comprising openings which penetrate the end wall of the cap and the projections for the accommodation and fixation of resilient commutator brushes and brush terminals corresponding with these, the commutator brushes and the brush terminals forming separate component parts.

A like brush assembly has been known already from German examined patent application No. 24 58 991. Like brush assemblies which are designated for small-size motors in particular are primarily characterized by a two-part design of their commutator brushes, namely one unit part thereof being the brushes themselves, while the other unit part is represented by the electrical connections of these. This division is an advantage insofar as only the first unit part constituting the actual brush is required to be made of a non-corroding and therefore relatively expensive material for ensuring a constantly optimal contact with the rotating commutator that cooperates with the commutator brush, whilst the second unit part constituting the electrical connections is but required to be made of any conventional electrically conductive material and, for this reason, is less costly and less problematic in respect of its dimensions.

A disadvantage of this brush assembly in electrical motors with a rotating drive shaft is to be seen in the relatively complicated assembly of the commutator brushes and the brush terminals which have to be mounted and secured from the inside of the cap before the electrical motor is closed. From this results that, for providing contact between the brush terminals and a current source from the outside, additional fastening means (soldering or plugs) are required in order to connect the brush terminals with the current source. Hence follows that fitting of the additional fastening means is possible only after the electrical motor has been mounted what renders the assembly more complicated. Another shortcoming resides in that the commutator brushes are only frictionally held in the openings by the brush terminals, what may have as a consequence that the commutator brushes quickly become loose by the action of vibrations and thus total failure of the electrical motor may be caused.

It is the object of the present invention to eliminate the shortcoming of the commutator brushes loosening and, simultaneously, to devise an electrical motor which permits the brush terminals to be mounted when the electrical motor is assembled, without there being need for any additional fastening means.

This object is achieved in that a fastening lug is designed at the commutator brush support which extends transversely to the motor axis and which is positively engageable with the projection, and in that the brush terminals can be inserted from the outside into the opening.

Thus, the brush assembly according to the instant invention affords ease of mounting and a safe securement of the commutator brushes inside the housing cap of the electrical motor holding them prior to the assembly of the electrical motor. After the electrical motor has been assembled, and when installing said into an appliance, the brush terminals can be introduced easily from the outside into the openings provided for this purpose, in which openings they will move into contact with the commutator brush supports and will be held captive by these. It is rendered possible hereby that, already prior to the mounting of the brush terminals to the electrical motor, these can be connected with the current-conveying cables and not only after the contact lugs (brush terminals) have been integrated into the electrical motor, as is the case in the state of the art.

To fasten and to center the commutator brush supports on the housing cap close to the stator, inventively, each projection of the housing cap is provided with a plane support which serves to axially retain the commutator brushes and on which the angled-off fastening lug pertaining to each commutator brush supports can be mounted and can be secured in position on the cap's projections by means of a centering plug shaped at the support and penetrating a bore in the fastening lug. After the fastening lug has been mounted on the centering plug, the latter will expand by plastic deformation, thus becoming positively engaged with the fastening lug.

Furthermore, it is expedient that the portions of the commutator brush supports and of the brush terminals which are inserted into the end wall of the housing cap from opposing sides, the said portions meeting in each of the two openings, will be interconnected electrically by a force-fit arrangement effective in dependence on the insertion, and that the brush terminals are secured in their functionally proper position. It will be accomplished thereby that the brush terminals are kept captive in the openings by the force-fit arrangement.

Finally, with a view to achieving a design as simple and as low-priced as possible, the force-fit arrangement is composed of each one resilient and protruding tongue which pertains to the base portion of the commutator brush and extends in parallel thereto, and the brush terminal is in resilient biassed abutment on the tongue. The width of the opening (slot) is dimensioned such that both parts are pressed in there side by side in frictional engagement.

It is advantageous that the brush terminals are connected to a switch arrangement controlling the electrical motor. A switch which switches the electrical motor on and off can be secured to the electrical motor directly on top of the brush terminals, whereby the need for additional fastening means for the switch is obviated.

The subject matter of the present invention will be described in more detail hereinbelow by way of an embodiment illustrated in the accompanying drawing. In the drawing, FIG. 1 is a longitudinal cross-section through the housing cap containing the inventive brush assembly, and FIG. 2 is a top view in the direction X of the housing cap according to FIG. 1 installed on the electrical motor.

Figure 2:
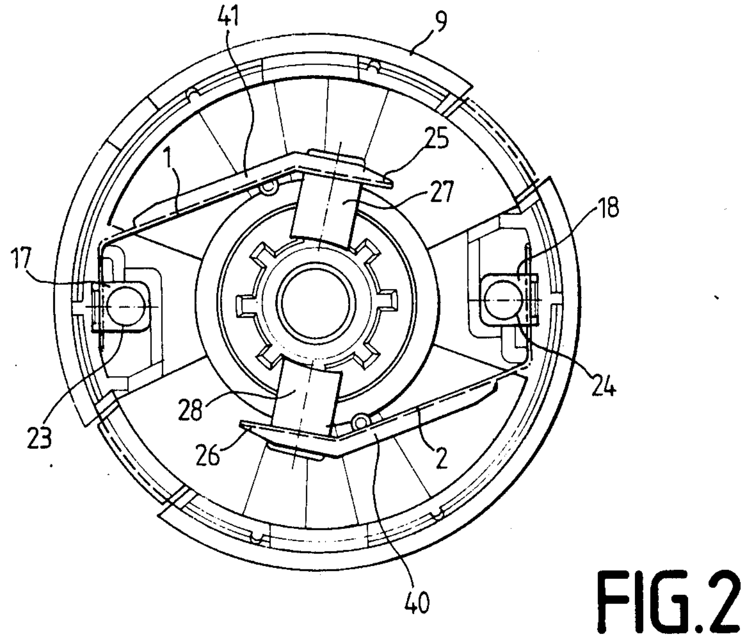

As can be gathered from FIGS. 1 and 2, the inventive brush assembly comprises a contact pair which consists of two commutator brushes, and which coacts in a conventional fashion with a rotating commutator (not illustrated) of the rotor (not illustrated) of an electrical motor which serves for example to drive a domestic appliance or a personal care appliance. Herein, the individual commutator brush supports 1 and 2, respectively, are retained in each one inwardly extending unit projection 7 and 8, respectively, of a housing cap 10 located on the frontal end of the stator housing 9 of the electrical motor.

The leaf-spring like configured commutator brush supports 1 and 2 are sheet-metal parts 40, 41 angled off from the angles adjacent each projection, 7 and 8, respectively, is a slot shaped opening 12 and 13, respectively, which penetrates the end wall 11 of the housing cap 10 and into which the base portions 14 and 15, respectively, of the longitudinally extending commutator brush support 1 and 2, respectively, that is bent off at right angles relative to these latter can be slid in the axial direction of the housing cap 10, and, that is to say, in the functionally proper manner from the interior of the cap, consequently from the hollow space 16.

The base portions 14 and 15, respectively, of the commutator brush support 1 and 2, respectively, are each furnished with a rectangularly bent-off fastening lug 17 and 18, respectively, extending in parallel to the plane of the end wall 11, the said lugs bearing against each one support 19 and 20, respectively, formed at the unit projections 7 and 8 of the housing cap 10 in the installed condition of the commutator brushes 1 and 2, respectively. Plugs 21 and 22, respectively, penetrate each one centering hole 23 and 24, respectively, of the fastening lugs 17 and 18, respectively, and, due to rivet-like deformation, the commutator brush support 1 and 2, respectively, are immovably and undetachably fixed on the housing cap 10 of the electrical motor. The commutator brush supports 1 and 2, respectively, which are thus secured in position on the frontal end of the housing cap 10 abut with square carbon rod brushes 27 and 28, respectively, fitted to their free ends 25 and 26, respectively, self-resiliently on the commutator of the rotor, the (non-illustrated) rotor shaft of said being received by a pivot bearing 30 carried by the housing cap 10. The commutator brush supports 1 and 2 are pressed radially resiliently outwardly only when the rotor is mounted and will then be permanently bearing against the rotor with preload.

The slot-shaped openings 12 and 13, respectively, securing the commutator brush supports 1 and 2, respectively, in position are dimensioned such in their width and depth that beside the brush base portions 14 and 15, respectively, each brush terminal 32 and 33, respectively, can be inserted into the openings 12 and 13, respectively. In this arrangement, each brush terminal 32 and 33, respectively, is composed of a flat, inherently rigid contact strip made of electrically conductive material, for instance brass, which can be inserted from the outside into the receiving slot-shaped opening 12 and 13, respectively, which penetrates the end wall 11 of the housing cap 10 entirely, as facilitated by the conically configured outside inlets 34 and 35, respectively, of these two slot-shaped openings 12 and 13. The brush terminals are connected to a switch arrangement S controlling the operation of the electrical motor.

Inside the slot-shaped openings 12 and 13, respectively, of the retaining unit projections 7 and 8, respectively, are the base portions 14 and 15, respectively, of the commutator brushes 1 and 2, respectively, inserted from opposed directions, i.e. from the inside, to the insertion direction of the brush terminals 32 and 33, respectively, so that corresponding portions lie side by side. The thus adjacently disposed base portions 14 and 15, respectively, and the brush terminals 32 and 33, respectively, are secured in position within the slot-shaped openings 12 and 13, respectively, by virtue of each one close-fit arrangement 36 and 37, respectively, which becomes effective with this assembling action. This close-fit arrangement 36 and 37, respectively, is constituted by a bent-out resilient tongue 38 and 39, respectively, which coacts with the corresponding connecting brush-terminal 32 and 33, respectively, in the sense of clamping, that is to say by pressing the said terminals against the inner walls of the slot-shaped opening 12 and 13, respectively, tongues 38, 39 extending in the direction of insertion of the connecting contact 32 and 33, respectively. Alternatively the tongue 38, 39 respectively, performing the clamping function may be formed on connecting terminals 32 and 33, respectively, and act upon the base portions 14 and 15, respectively, of the commutator brush supports 1 and 2, respectively, in the fashion described hereinabove.

We claim:

1. A brush assembly for an electrical motor that has an axis comprising a housing cap of insulating material that defines a chamber region for receiving a commutator brush member, projection structure in said cap chamber region, said projection structure having a support surface extending transverse to the axis of the motor, structure defining a slot-shaped opening that extends parallel to the axis of the motor and penetrates said housing cap, commutator brush support structure in said chamber region and extending transversely to the motor axis, said commutator brush support structure having a first integral brush support portion positively engaged on said support surface of said projection structure and a second integral brush support portion disposed in said slot-shaped opening, and brush terminal terminal structure disposed in said slot-shaped opening and extending from outside said cap and interconnected electrically with said second integral brush support portion of said commutator brush support structure in said slot-shaped opening by a force-fit arrangement.

2. A brush assembly as claimed in claim 1 wherein said support surface of said projection structure is planar, said first integral brush support portion includes an integral fastening lug portion that defines an aperture, and centering structure that penetrates said aperture in said fastening lug portion and secures said fastening lug portion in position on said planar projection structure support surface.

3. A brush assembly as claimed in claim 1 wherein said force-fit arrangement includes a resilient tongue which projects from one of said second integral brush support structure portion and said brush terminal structure.

4. The brush assembly as claimed in claim 3 wherein said resilient tongue is formed in said second integral brush support portion and said brush terminal structure is in resiliently biased abutment with said tongue.

5. A brush assembly as claimed in claim 1 and further including a switch arrangement connected to said brush terminal structure for controlling the electric motor.

6. A brush assembly for an electrical motor that has an axis comprising a housing cap of insulating material that defines a chamber region of generally cylindrical configuration, two projection structures disposed in said chamber region in diametrically opposed relation, each said projection structure having a support surface extending transverse to the axis of the motor, structure defining a slot-shaped opening that extends parallel to the axis of the motor adjacent each said projection structure, each said slot-shaped opening penetrating said housing cap, two commutator brush support structure in said chamber region, each said commutator brush support structure being disposed on a corresponding one of said projection structures and extending generally radially inward, each said commutator brush support structure having a commutator brush secured adjacent its radially inward end and having a first integral brush support portion adjacent its radially outward end that is positively engaged on the support surface of the corresponding one of said projection structures, and a second integral brush support portion adjacent its radially outward end that is disposed in the corresponding one of said slot-shaped openings, and two brush terminal structures, each said brush terminal structure being disposed in a corresponding one of said slot-shaped openings in electrical contact with said second integral brush support portion of its corresponding brush support structure.

7. The brush assembly as claimed in claim 6 wherein each said brush terminal structure is a planar metal member that is inserted into its said slot-shaped opening from outside said housing cap.

8. A brush assembly as claimed in claim 7 wherein each of said first integral brush support portions includes an integral planar fastening lug portion that is seated on said support surface of its corresponding said projection structure and each said second integral brush support portion includes an integral planar portion that extends generally perpendicularly to its adjacent fastening lug portion.

9. A brush assembly as claimed in claim 8 wherein each said second integral brush support portion of said commutator brush support structure is interconnected with its corresponding said brush terminal structure by a force-fit arrangement.

10. A brush assembly as claimed in claim 9 wherein each said force-fit arrangement includes a resilient tongue which projects from each said second integral brush support portion, and a planar surface of each said brush terminal structures is in resiliently biased abutment with said tongue of its corresponding second integral brush support portion.

* * * * *

UNITED STATES PATENT AND TRADEMARK OFFICE
CERTIFICATE OF CORRECTION

PATENT NO. : 4,774,430

DATED : September 27, 1988

INVENTOR(S) : Emilio Rodriguez, et al.

It is certified that error appears in the above-identified patent and that said Letters Patent is hereby corrected as shown below:

Col. 2, line 17, "supports" should be --support--.
Col. 3, line 12, "support" should be --supports--;
line 28, "support" should be --supports--;
line 61, "are" should be deleted;
line 62, "brushes" should be --brush support--;
line 62, after "respectively," --are-- should be inserted.
Col. 4, line 7, "brush-terminal" should be --brush terminal--;
line 14, after "on", --the-- should be inserted.
Col. 4, claim 1, line 38, "terminal" should be deleted.
Col. 5, claim 6, line 9, "structure" should be --structures--.
Col. 6, claim 9, line 17, after "interconnected", --electrically should be inserted.

Signed and Sealed this

Fourth Day of July, 1989

*Attest:*

DONALD J. QUIGG

*Attesting Officer*

*Commissioner of Patents and Trademarks*